(12) United States Patent
Grohmann et al.

(10) Patent No.: US 8,870,518 B2
(45) Date of Patent: Oct. 28, 2014

(54) METHOD AND DEVICE FOR STACKING

(75) Inventors: Klaus Grohmann, Hersdorf (DE);
Lothar Thommes, Bitburg (DE);
Charles W. McClure, White Lake, MI (US)

(73) Assignee: Grohmann Engineering GmbH, Pruem (DE)

( * ) Notice: Subject to any disclaimer, the term of this patent is extended or adjusted under 35 U.S.C. 154(b) by 229 days.

(21) Appl. No.: 13/141,396

(22) PCT Filed: Feb. 22, 2010

(86) PCT No.: PCT/EP2010/052210
§ 371 (c)(1),
(2), (4) Date: Jun. 22, 2011

(87) PCT Pub. No.: WO2010/100049
PCT Pub. Date: Sep. 10, 2010

(65) Prior Publication Data
US 2011/0305553 A1  Dec. 15, 2011

(30) Foreign Application Priority Data

Mar. 6, 2009 (DE) .......................... 10 2009 011 510

(51) Int. Cl.
*H01F 41/02* (2006.01)
*B65G 19/24* (2006.01)
(Continued)

(52) U.S. Cl.
CPC .......... *H01F 41/0233* (2013.01); *B65G 19/245* (2013.01); *B65B 61/28* (2013.01); *B65G 19/225* (2013.01); *B65B 43/52* (2013.01); *B65G 59/066* (2013.01); *B07C 3/008* (2013.01); *B65G 57/302* (2013.01); *B65G 57/308* (2013.01)
USPC .................................... 414/795.3; 198/626.1

(58) Field of Classification Search
CPC ...... B65G 15/14; B65G 15/50; B65G 57/302; B65G 59/066; B65G 59/107; B65G 60/00
USPC ........... 198/463.2, 607, 620, 626.1, 801, 817, 198/832.2; 221/77; 271/212, 217; 414/327, 414/790.2, 790.3, 790.9, 791, 791.1, 794.4, 414/794.9, 795, 795.1, 795.2, 795.3, 795.6, 414/796.9, 797.5
See application file for complete search history.

(56) References Cited

U.S. PATENT DOCUMENTS 2,695,125 A * 11/1954 Bowen ........................... 53/299
2,963,177 A * 12/1960 Shields ...................... 414/790.3
(Continued)

FOREIGN PATENT DOCUMENTS

DE          1176745         8/1964
DE          2537410         3/1977
(Continued)

OTHER PUBLICATIONS

International Preliminary Report on Patentability in PCT/EP2010/052210 mail dated Sep. 20, 2011.

*Primary Examiner* — Gregory Adams
(74) *Attorney, Agent, or Firm* — Lucas & Mercanti, LLP

(57) ABSTRACT

A device and to a method for stacking plate-like products into a straight, cylindrical stack having an upper and a lower side and at least two side surfaces arranged at a distance from each other. In order to create a desired pretension in the stack already during stacking, which can even be maintained when individual products are added, the plate-like products are lifted against gravity from the bottom to the top into a stack nest, the products are held in the stack nest by applying a force on the side surfaces thereof to prevent dropping in the direction of gravity. While the force application is maintained, further products are added to the stack in the stack nest from the bottom side.

19 Claims, 6 Drawing Sheets

(51) Int. Cl.
*B65B 61/28* (2006.01)
*B65G 19/22* (2006.01)
*B65B 43/52* (2006.01)
*B65G 59/06* (2006.01)
*B07C 3/00* (2006.01)
*B65G 57/30* (2006.01)

(56) References Cited

U.S. PATENT DOCUMENTS

| | | | | |
|---|---|---|---|---|
| 3,030,867 | A | * | 4/1962 | Wright .................. 493/142 |
| 3,092,266 | A | * | 6/1963 | Dekoning ............. 414/788.9 |
| 3,124,231 | A | * | 3/1964 | Ott, Jr. ................ 198/604 |
| 3,658,194 | A | * | 4/1972 | Gendron et al. ........ 414/795.6 |
| 4,400,124 | A | * | 8/1983 | Greller ................ 414/790.2 |
| 4,527,672 | A | | 7/1985 | Schreiner et al. |
| 4,548,316 | A | * | 10/1985 | Maurer ................ 198/832.2 |
| 4,902,184 | A | * | 2/1990 | Fritz ................... 414/790.3 |
| 4,938,649 | A | * | 7/1990 | ter Horst et al. ........ 414/412 |
| 5,176,494 | A | * | 1/1993 | Nigrelli et al. ......... 414/795.6 |
| 5,199,547 | A | * | 4/1993 | Boldrini et al. ........ 198/463.2 |
| 5,878,999 | A | * | 3/1999 | Neri et al. ............ 270/58.08 |
| 6,766,900 | B2 | * | 7/2004 | Kanaris ................ 198/835 |
| 2006/0219610 | A1 | * | 10/2006 | Varney et al. .......... 209/584 |

FOREIGN PATENT DOCUMENTS

| | | | |
|---|---|---|---|
| DE | 4126328 C1 | * 12/1992 | ......... B65G 59/06 |
| EP | 1 108 663 | 6/2001 | |
| EP | 1108663 | 6/2001 | |

* cited by examiner

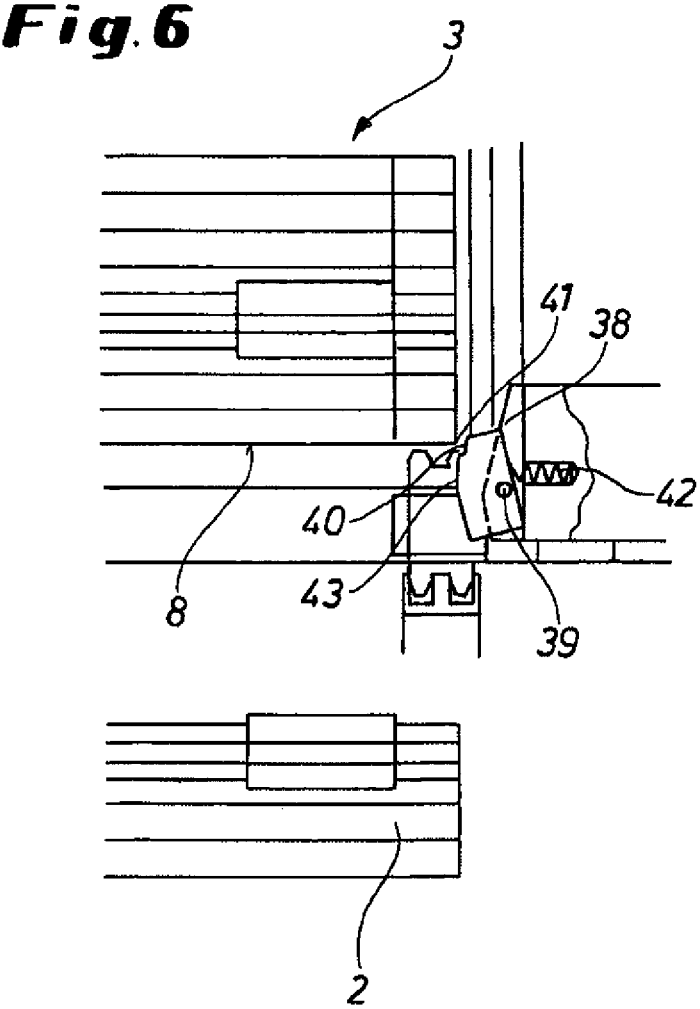

METHOD AND DEVICE FOR STACKING

PRIORITY CLAIM

This is a U.S. national stage of Application No. PCT/EP2010/052210, filed on Feb. 22, 2010, which claims priority to German Application No: 10 2009 011 510.2, filed: Mar. 6, 2009, the contents of which are incorporated herein by reference.

BACKGROUND OF THE INVENTION

Field of the Invention

The invention concerns a device and a method for stacking plate-like products into a straight, cylindrical stack with an upper side and an underside and at least two lateral surfaces located some distance apart. In addition, the stack has a front side and a rear side. Stacking tasks of this type involving the stacking of identical products arise, for example, when the core stacks of transformers or the plates of clutches are put together.

SUMMARY OF THE INVENTION

An object of the present invention is to produce a desired pretension in the stack during the stacking process, which can be maintained even when individual products are added. It should be possible to remove the pretensioned stack from the device with an extraction device while maintaining the pretension.

The aforesaid objective with respect to one embodiment of a method is achieved by lifting the plate-like products up into a stack nest from below against the force of gravity, holding the products in the stack by applying force at least to the lateral surfaces of the stack to prevent dropping in the direction of the force of gravity, and adding additional products to the stack in the stack nest from the underside while maintaining the force applied to the lateral surfaces of the stack.

The application of force to the lateral surfaces of the products produces in the essentially vertical stack a pretension perpendicular to the direction of the force of gravity that holds the stack together, even when additional products are added.

Additional products are added to the stack nest exclusively from the underside.

In addition, a holding force can be exerted on the underside of the stack, especially by a locking element in the form of a catch, to prevent the stack from dropping in the stack nest. The additional holding force is necessary especially when the application of force to the lateral surfaces is not sufficient to reliably prevent dropping of the stack during the entire stacking operation.

When additional products are added, the plate-like products are compressed slightly due to their elastic properties, so that pretension develops in the stack in the vertical direction. The application of force to the lateral surfaces of the products in the stack is maintained during the addition of further products. The opposing force to the buildup of the pretension in the vertical direction results from the weight of the products already contained in the stack nest and is additionally increased especially by the exertion of an additional force on the stack from its upper side by a counterholding unit. This force can be continuously varied during the stacking operation as a function of the height of the stack (e.g., by weighting with 20, 40, 60, 80 kg).

The products are preferably added to the stack nest by a lifting arrangement, which takes the products from a product stock reserve located under the underside of the stack and lifts them up to the underside of the stack in the stack nest. The product stock reserve can be designed, for example, as a rotary table, on whose periphery nests of plate-like product are arranged. Each product nest carries at least one plate-like product to be added. However, it is also possible for the lifting arrangement to take several products from the product nest of the product stock reserve at the same time and lift them into the stack nest.

As soon as the stack has reached the desired height, the stack is removed from the stack nest with an extraction device, which can be designed, for example, as a C-shaped frame. The free horizontal arms of the frame are brought into contact with the upper side and underside of the stack. The application of force to the lateral surfaces of the stack and possibly by the counterholder is then temporarily suspended. The extraction device can then remove the stack, which remains under compression in the frame, from the stack nest. The stack nest is available for new stacking tasks.

A device for automatically stacking plate-like products in accordance with one embodiment of the method of the invention is characterized by at least one traction mechanism that revolves between a lower and an upper deflection device and can be brought into contact with each lateral surface, wherein the drive of the traction mechanism has a free-running hub, which acts as a back stop and prevents downward movement of the traction mechanism resting against the stack; a counterholding unit that can be moved in the vertical direction and can be brought into contact with the upper side of the stack; and a lifting arrangement for at least one plate-like product that can be moved in the vertical direction to the underside of the stack and that can be moved between a receiving position located below the lower deflection device of each traction mechanism drive and a delivery position located above it.

The stack nest of the device is formed by at least two symmetrically arranged traction mechanism drives, where conveyor belts or conveyor chains can potentially be used as traction mechanisms. Each traction mechanism drive has a free-running hub, which is directionally switched in such a way that, after they have been lifted into the product nest, the products to be stacked are held in position, and dropping of the stack after the upward movement of the lifting arrangement is prevented.

To prevent dropping the stack in the stack nest when not enough force is applied to the lateral surfaces, the device can have at least one locking element that can rotate about an axis and has a stop face, which can be temporarily brought into contact with the edge of the underside of the stack. The stop face of the locking element grips under the edge of the stack on its underside. During the addition of additional products, the preferably spring-loaded locking element briefly swings away and frees the underside of the stack. As soon as another product has been added to the stack, the locking element snaps back due to the spring loading, and the stop face moves back under the lower edge of the stack.

The counterholding unit can be brought into contact with the upper side of the stack in order to apply a force in the stack from the bottom to the top.

The lifting arrangement preferably has a supporting plate that is aligned parallel to the underside of the stack and can be moved between a receiving position located below the lower deflection device of the traction mechanism drives and a delivery position located above it. In the receiving position, the products that are to be added to the stack from the underside are taken, for example, from the shaped nest of the rotary table and then in the delivery position are added to the stack from the underside. During the process of adding the product, the lateral edges of the product, which form the lateral surfaces of the stack, arrive between the traction mechanism drives that are arranged symmetrically along the lateral surfaces.

To reduce the friction of the stack in the stack nest during the upward movement of the lifting arrangement, support rollers for the revolving traction mechanism can be arranged along the contact surfaces of the stack and traction mechanism.

The vertically moving counterholding unit, which can be arranged especially on a linear guide, can be weighted to produce the opposing force. The opposing force can be increased, depending on the stack height, by applying additional weights. Alternatively or additionally, in an advantageous embodiment of the invention, a drive unit can apply motive force to the counterholding unit in the direction of the upper side of the stack. The drive unit can be, for example, a cylinder operated by a pressure medium.

To vary the application of force to the lateral surfaces of the stack or to temporarily eliminate it altogether, all of the traction mechanism drives are provided, at least on one side of the stack, with a device for developing contact pressure of the traction mechanism on the lateral surface of the stack. Preferably, however, all of the traction mechanism drives are equipped with devices of this type. Possible devices for developing contact pressure include especially cylinders operated by a pressure medium that are arranged horizontally in the vicinity of the deflection devices of the traction mechanism drive. The cylinders make it possible to produce variable contact pressures of the traction mechanism along the contact surface between the traction mechanism and the stack.

To allow trouble-free removal of the stack at its front side from the stack nest with the extraction device after completion of the stacking process, all of the traction mechanism drives, at least on one side of the stack, can be moved away from the lateral surface of the stack. Assuming a corresponding stroke of the cylinders that produce the contact pressure, this movement can be produced by these cylinders. Preferably, the traction mechanism drives on both sides of the stack are designed to be capable of being moved away, for example, by a swinging movement.

The counterholding unit has a plate that lies flat on the upper side of the stack. This guarantees uniform introduction of force into the stack. As viewed from the front side of the stack, the middle section of the plate is provided with a recess for the engagement of an arm of the C-shaped extraction device. The arm engages the recess and, together with the opposing arm that rests against the underside of the stack, takes over the compression of the finished stack. To end the application of force by the counterholding unit, the counterholding unit is moved vertically from the upper side of the stack into a terminal position. In addition, the traction mechanism drives are moved away from the lateral surfaces of the stack.

In a refinement of the invention, to improve the guidance of the stack during the stacking process under compression, in addition to the traction mechanism drives arranged on both sides, guides, especially in the form of guide rods, can be arranged at least on the rear side of the stack to guide the stack.

BRIEF DESCRIPTION OF DRAWINGS

The invention will now be explained in greater detail with reference to the accompanying drawings.

FIG. 6 is a detailed view of a locking element for a device of the invention.

DETAILED DESCRIPTION OF DRAWINGS

Figure 1:
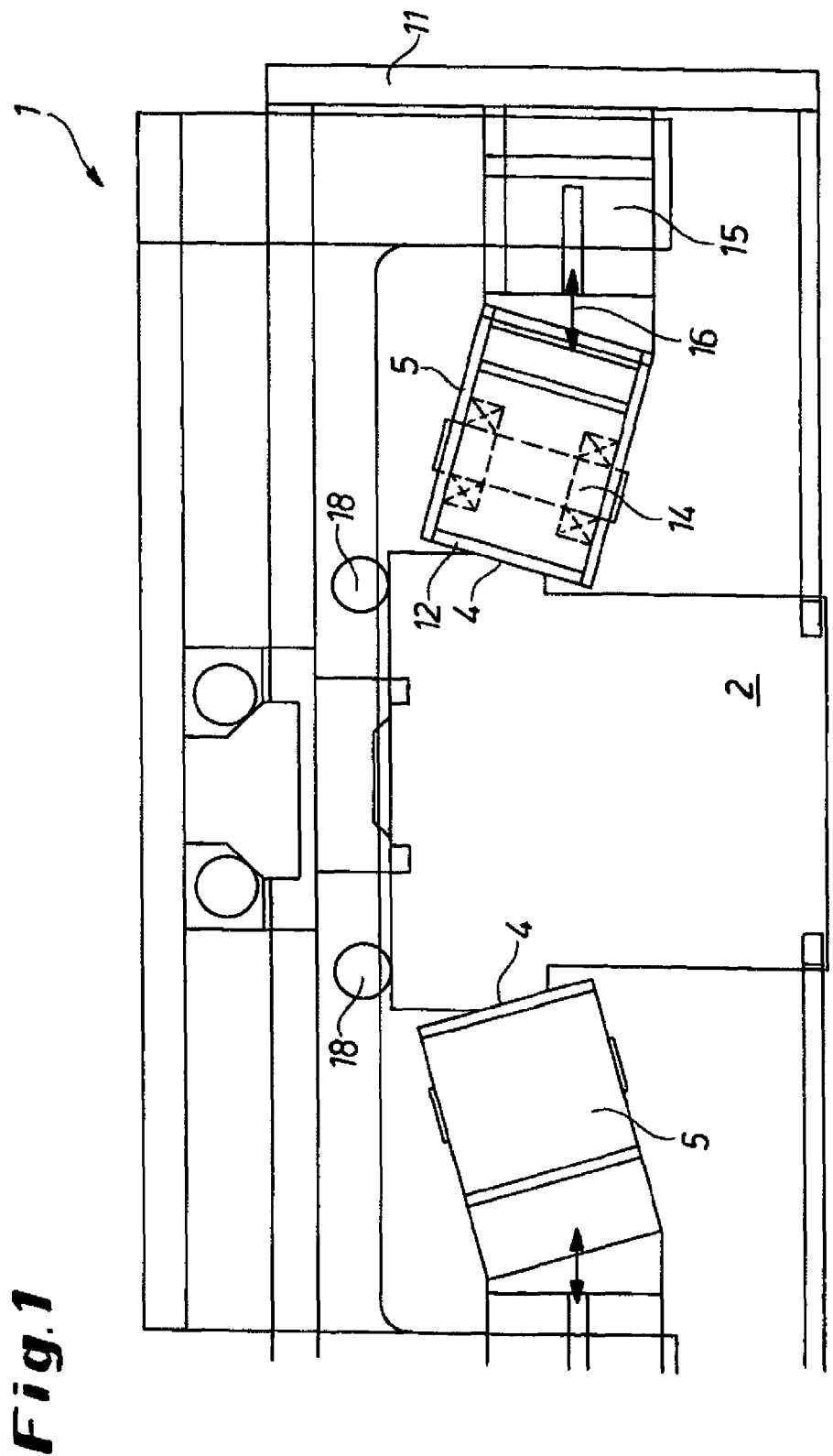
FIG. 1 is a schematic sectional top view of a device in accordance with one embodiment of the invention.

The device 1 in FIG. 1 for stacking plate-like products 2 into a straight, cylindrical stack 3 (FIG. 2) consists essentially of a traction mechanism drive 5 that can be brought into contact with each lateral surface 4 of the stack 3, a vertically moving counterholding unit 7 (FIG. 2) that can be brought into contact with the upper side 6 of the stack 3, and a lifting arrangement 9 (FIG. 9) that can be moved vertically to the underside 8 of the stack 3.

In addition, a rotary table 10 (FIG. 3) is arranged between the lifting arrangement 9 and the underside 8 of the stack 3. The rotary table 10 keeps products ready for delivery to the lifting arrangement 9. Furthermore, the device has a frame 11 for holding the traction mechanism drives 5, the guides, and the counterholding unit 7, including its guide elements.

The stack nest for the stack 3 is formed by the two symmetrically arranged traction mechanism drives 5. Each traction mechanism drive 5 has as a traction mechanism a conveyor belt 12 that revolves between a lower and an upper deflection pulley 13a, 13b. The deflection pulleys 13a, 13b have a free-running hub 14, which as a back stop prevents downward movement of the conveyor belt 12 resting against the stack.

Figure 2:
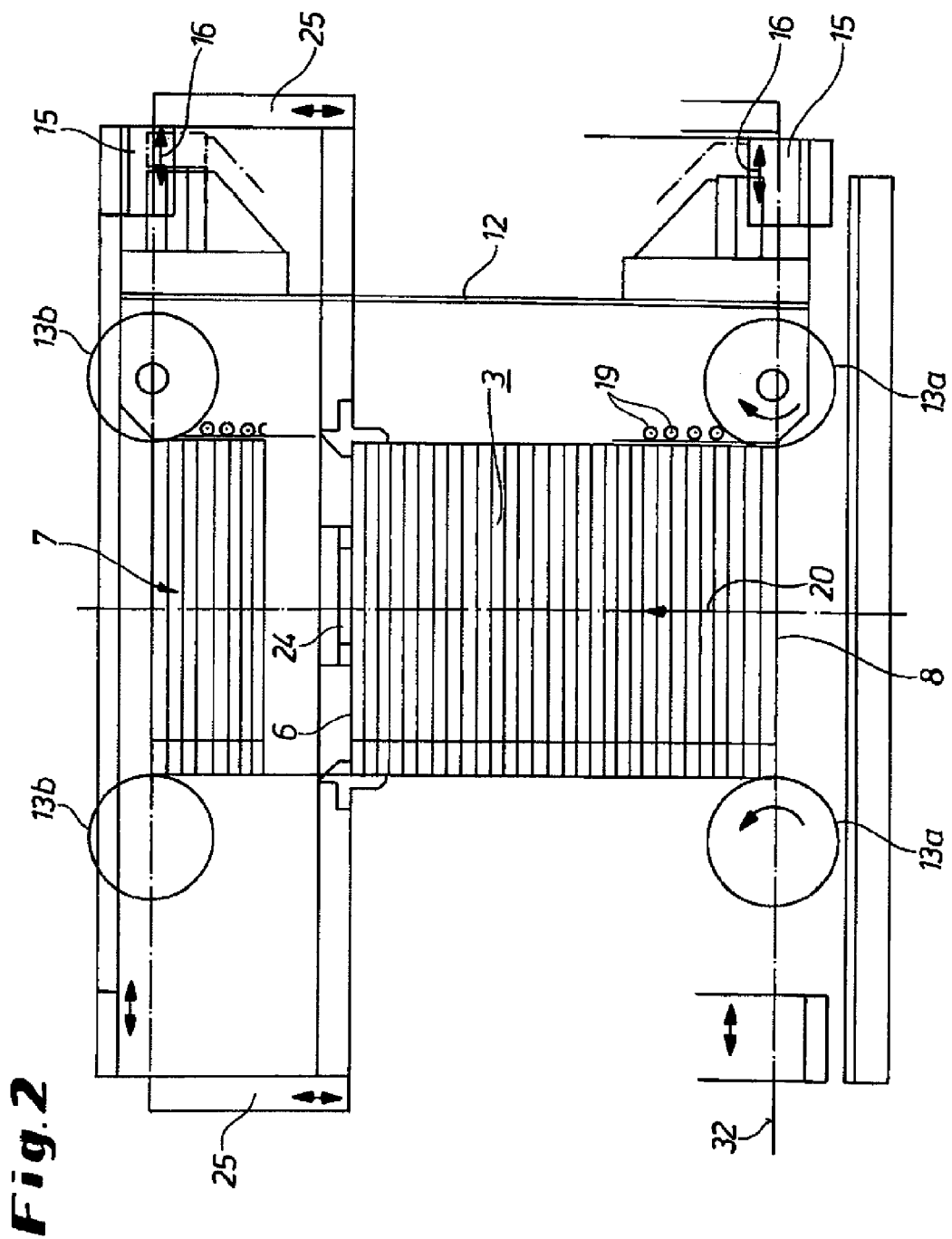
FIG. 2 is a schematic front view of the device with a lifting arrangement.

The traction mechanism drives 5 are each contacted at the height of the upper and lower deflection pulleys 13a, 13b by a horizontally acting cylinder 15 on the frame 11 of the device (FIG. 2). The function of the horizontally acting cylinders 15 is to produce a variable contact pressure of the conveyor belt 12 along the contact surface with the stack 3. Due to their adjustment path 16, the synchronously operable horizontally acting cylinders 15 allow complete withdrawal of the traction mechanism drives 5 from the lateral surfaces 4 of the stack 3. The two conveyor belts 12, together with the two guide rods 18 that rest on the rear side 17 of the stack 3, serve to guide the stack 3 during the stacking process. As is indicated especially in FIG. 2, support rollers 19 are mounted along the contact surfaces between the stack 3 and the conveyor belt 12. These free-running support rollers 19 reduce friction during the upward movement of the stack 3 in the direction of the arrow 20. During the upward movement of the stack 3, the plate-like products 2 are slightly compressed, so that pretension develops in the stack 3 in the vertical direction. This leads to a slight relative movement between the edges of the products 2 and the adjoining conveyor belts 12 of the products 2. This relative movement can be better controlled by the support rollers 19. Furthermore, the support rollers 19 contribute to linear guidance of the stack 3 in the vertical direction during the stacking operation.

Figure 3:
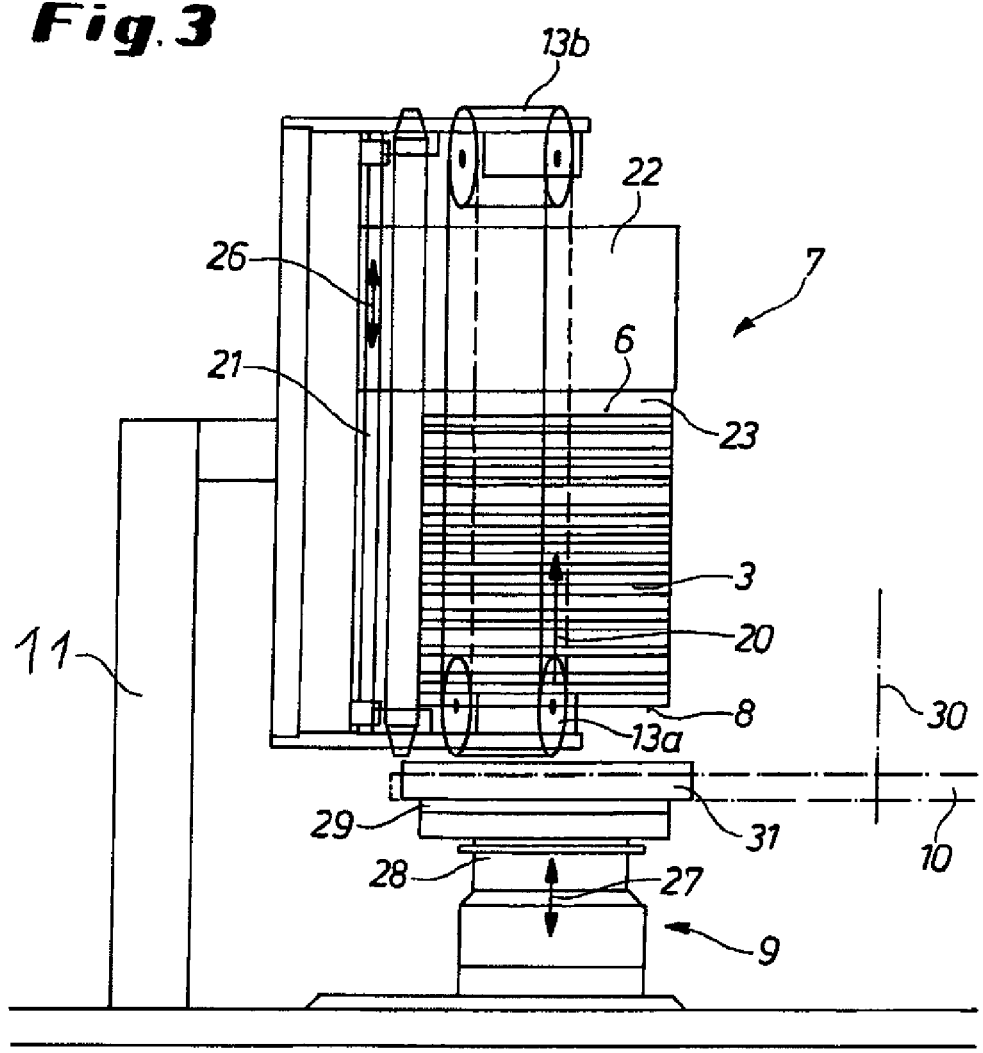
FIG. 3 is a schematic section through the device showing the lifting arrangement.

The counterholding unit 7 comprises a block 22 which is guided on a sliding guide 21 and on which a counterholding plate 23 is mounted (FIG. 3). The counterholding plate 23 rests on the upper side 6 of the stack during the stacking process. As is shown schematically in FIG. 2, the counterholding plate 23 has a recess 24 in its front side to allow the stack 3 to be removed with an extraction device after the stack has reached its desired height.

The counterholding unit 7 applies a force to the stack which results from its weight and a cylinder 25 that is operated especially with a pressure medium (FIG. 2). To temporarily end the application of force by the counterholding unit 7 after completion of the stacking operation, the counterholding unit 7 is moved by the cylinder 25 in the direction of the arrow 26 into an upper terminal position.

The lifting arrangement 9 consists essentially of a lifting cylinder 28 which can be moved in the z-direction 27 and on whose piston rod a pressure plate 29 is mounted. Rotary table 10, which is supported in such a way that it can rotate about an axis 30, is arranged between the lower deflection pulley 13a and the lowered pressure plate 29. Several product nests 31 are arranged on the outer periphery of the rotary table 10. The product nests 31 can be realized, for example, as passages with a peripheral edge, on which the edges of the plate-like products 2 rest. Preferably, the product nests 31 are realized as interchangeable inserts in the rotary table 10, so that they can be adapted to different products 2. The passage in each product nest 31 is large enough that the pressure plate 29 can pass through the passage unhindered. This makes it possible for the pressure plate 29, during its upward movement in the z-direction 27, first to take the product or products 2 that are to be stacked out of the product nest 31 and add the product or products 2 to the underside 8 of the stack 3 when the stack level 32 has been reached. The stack level 32 is located at the level of the axes of the lower deflection pulleys 13a. When the stack level 32 has been reached, the lateral edges of the products 2 move between the conveyor belts 12 of the opposing traction mechanism drives 5.

To prevent the stack 3 from dropping in the stack nest, especially when insufficient force is being applied to the lateral surfaces by the conveyor belts 12, the device 1 can have at least one locking element 38 that can rotate about an axis 39 and that has a stop face 40, which can be temporarily brought into contact with the edge of the underside 8 of the stack 3 (see FIG. 6). The stop face 40 of the locking element 38 grips under the edge 41 of the stack 3 on its underside 8. The products 2 to be added to the stack 3 slide with their rear edge that faces the guide rods 34 along a sliding surface 43 of the locking element 38. This causes the locking element 38, which is tensioned by a compression spring 42, to swing briefly in the clockwise direction about the axis 39 when further products 2 are added and to free the underside 8 of the stack. As soon as the additional products 2 have been added to the stack 3, the locking element 38 snaps back due to the spring loading, and the stop face 40 moves back under the lower edge 41 of the stack.

After completion of the stacking operation at a stack height H, the stack 3 is removed by an extraction device (not shown). The extraction device is realized especially as a C-shaped frame. The frame takes the stack 3 from the front side of the stack nest. In this operation, an arm grips the underside 8 of the stack 3 from below, while the other free arm of the C-shaped frame of the extraction device engages the recess 24 of the counterholding plate 23. The counterholding plate 23 is then moved away from the stack 3, which has been fixed in this way, into its upper terminal position by the cylinder 25. In addition, the traction mechanism drives 5, which are resting against the left and right lateral surfaces 4, are moved away from the stack 3 by the horizontally acting cylinders 15 to allow the stack 3, which is still under compression in the C-shaped frame, to be moved out of the stack nest. The stack nest is now available for another stacking task.

Figure 4:
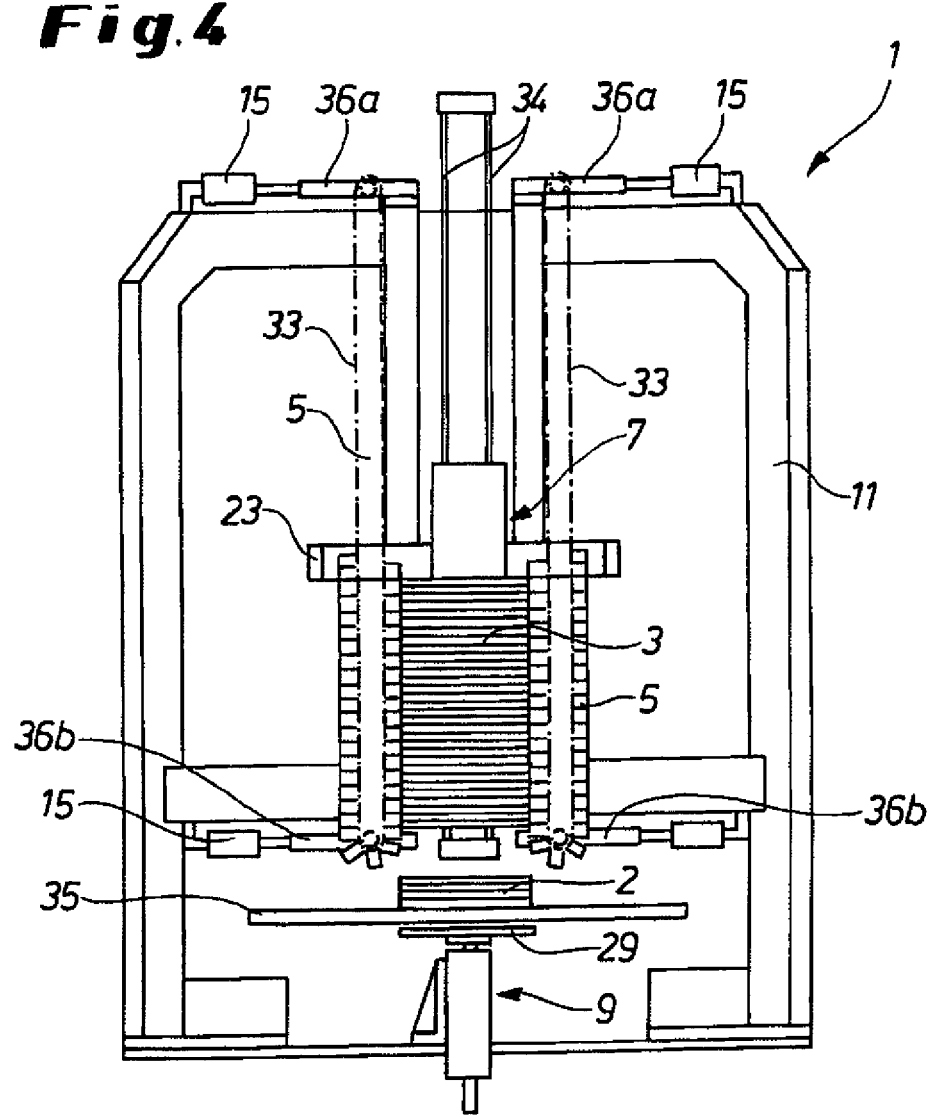
FIG. 4 is a front view of an embodiment of a device of the invention.
Figure 5:
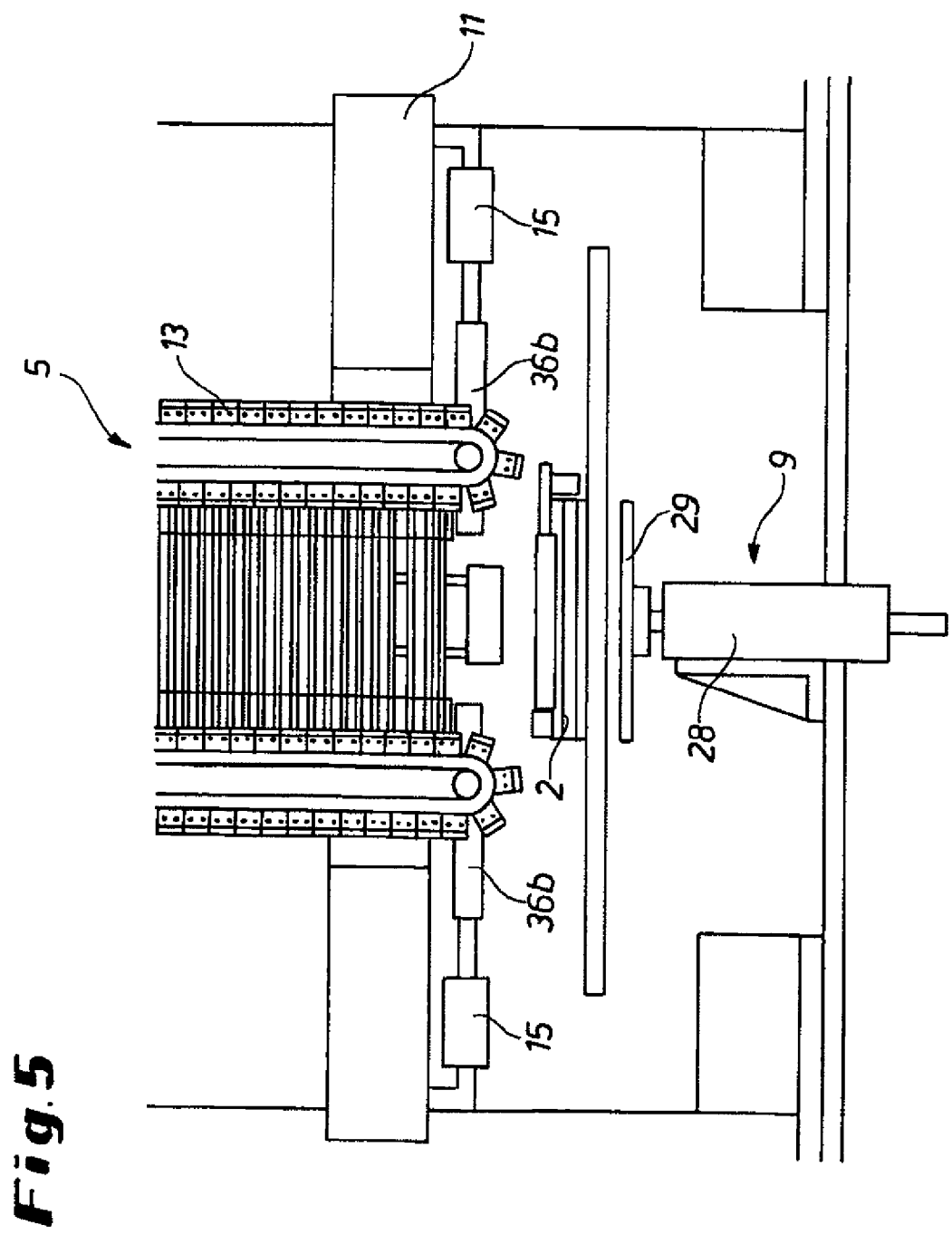
FIG. 5 is a detailed view of the layout of the lifting arrangement.

FIG. 4 is a more detailed view of a device 1 of the invention for stacking plate-like products 2. It differs from the device according to FIGS. 1 to 3 in that the traction mechanism drive 5 does not have a conveyor belt but rather a segmented chain 33. FIG. 4 shows the stack 3 shortly before the addition of several plate-like products 2 into the stack nest from below. The stack 3 is prevented from dropping in the direction of the force of gravity by the chains 33 lying against the lateral surface 4 on both sides. The chains 33 are part of traction mechanism drives 5 with a free-running hub. FIG. 4 shows that the counterholding unit 7 guided on the two guide rods 34 rests with its counterholding plate 23 level on the upper side 6 of the stack 3.

With the lifting of the pressure plate 29, the products 2 are lifted from the product stock reserve 35 and pushed from below against the stack 3 held in the stack nest, so that the stack 3, which is positioned between the two traction mechanism drives 5, is pushed upward and compressed. The necessary opposing force for the compression of the stack is exerted, on the one hand, by the weight of the stack 3 and, on the other hand, by the counterholding unit 7. In this embodiment of the device of the invention, each of the horizontally acting cylinders 15 acts on a supporting arm 36a, 36b that can be swiveled on the frame 11 in a horizontal plane about a vertical axis. To deflect the segmented chains 33, upper gear wheels of the traction mechanism drive 5 are arranged on the upper supporting arm 36a, and lower gear wheels of the traction mechanism drive 5 are arranged on the lower supporting arm 36b. To take the traction mechanism drives 5 that are lying against the lateral surfaces 4 out of action, the supporting arms 36a, 36b are swung away to both sides about the fixed axis of rotation in the frame by means of the horizontally acting cylinders 15.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for stacking plate-like products each with an upper side and an underside and at least two lateral surfaces located some distance apart into a straight, cylindrical stack, comprising:
   a lower deflection device; an upper deflection device;
   at least one traction mechanism of a traction mechanism drive that revolves between the lower and the upper deflection device configured to be brought into contact with each lateral surface of the plate-like products in the stack and applies a force to the lateral surfaces of the plate-like products in the stack to prevent dropping in a direction of the force of gravity;
   a back stop of the traction mechanism drive configured to prevent downward movement of the traction mechanism resting against the stack of the plate-like products;

a movable counterholding unit configured to be brought into contact with the upper side of the stack, the counterholding unit comprising a weight movable along guides, wherein the counterholding unit applies a force that is evenly distributed throughout the stack; and a lifting arrangement for at least one plate-like product that can be moved in the direction of the underside of the stack and can be moved between a receiving position located below the lower deflection device of each traction mechanism drive and a delivery position located above the lower deflection device while the force applied by the at least one traction mechanism is maintained, so that the at least one plate-like product is held in the stack by the at least one traction mechanism when the at least one plate-like product is moved to the delivery position by the lifting arrangement.

2. The device in accordance with claim 1, wherein each traction mechanism drive has support rollers for the revolving traction mechanism.

3. The device in accordance with claim 1, wherein each traction mechanism drive has a conveyor belt as the traction mechanism.

4. The device in accordance with claim 1, wherein each traction mechanism drive has a chain as the traction mechanism.

5. The device in accordance with claim 1, wherein the moveable counterholding unit is connected with a drive at least for the application of force to the upper side of the stack.

6. The device in accordance with claim 1, wherein at least one of the traction mechanism drives on one of the two lateral surfaces of the stack is provided with a device configured to develop contact pressure of the traction mechanism on the lateral surface of the stack.

7. The device in accordance with claim 1, wherein at least one of the traction mechanism drives on one of the two lateral surfaces of the stack can be completely moved away from the stack.

8. The device in accordance with claim 7, further comprising: at least one locking element configured to rotate about an axis having a stop face configured to be temporarily brought into contact with the edge of the underside of the stack.

9. The device in accordance with claim 1, wherein the moveable counterholding unit has a plate with a recess.

10. The device in accordance with claim 1, wherein the device has a guide configured to guide the stack at least on its rear side.

11. The device in accordance with claim 10, wherein the guide is a guide rod.

12. The device in accordance with claim 1, wherein the lifting arrangement produces a pretension in the stack when the at least one plate-like product is moved to the delivery position, the counterholding unit providing an opposing force to the pretension by a weight selected from one of 20 kg, 40 kg, 60 kg and 80 kg.

13. The device in accordance with claim 1, wherein the counterholding unit is configured to apply the constant force when the stack is held entirely by the at least one traction mechanism and the back stop and the lifting arrangement does not apply any force to the stack.

14. A method for stacking plate-like products with an upper side and an underside and at least two lateral surfaces located some distance apart into a straight, cylindrical stack, comprising:

providing an apparatus as recited in claim 1;

lifting the plate-like products into a stack in a stack nest from below against the force of gravity;

holding the plate-like products in the stack by applying force at least to the lateral surfaces of the stack to prevent dropping in the direction of the force of gravity; and adding additional plate-like products to the stack in the stack nest from the underside while the application of force is maintained.

15. The method in accordance with claim 14, wherein force is applied to the stack from its upper side by a counterholding unit.

16. The method in accordance with claim 15, wherein, during the step of adding, compressing the plate-like products due to elastic properties, thereby developing a pretension in the stack in a vertical direction, providing an opposing force to the pretension by the counterholding unit, and continuously varying the opposing force during stacking operation as a function of a height of the stack.

17. The method in accordance with claim 14, wherein the plate-like products are lifted into the stack nest by a lifting arrangement.

18. The method in accordance with claim 14, wherein the products are delivered to the lifting arrangement from a product stock reserve.

19. The method in accordance with claim 14, further comprising:

bringing an extraction device into contact with the upper side and the underside of the stack, and temporarily suspending the application of force to the lateral surfaces of the stack and the application of force by the counterholding unit.

* * * * *